ADAM R. THOMPSON
INVENTOR.

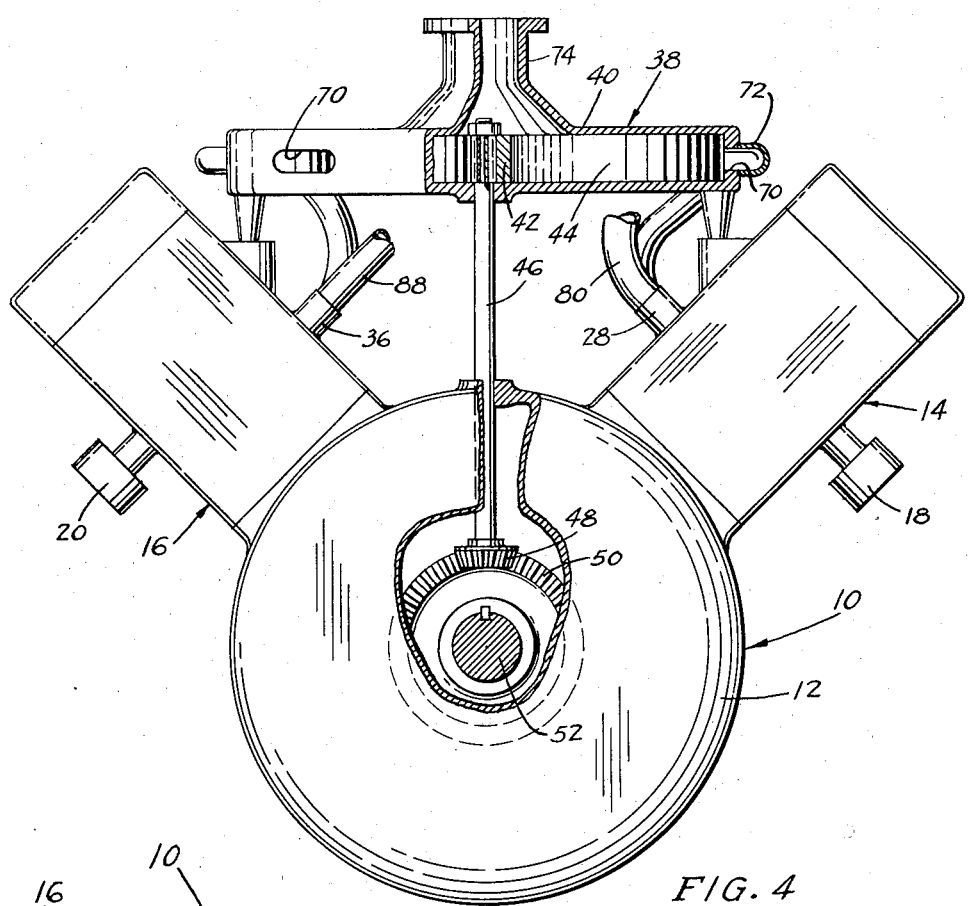

United States Patent Office 2,844,133
Patented July 22, 1958

2,844,133

SUPERCHARGER AND FUEL DISTRIBUTOR SYSTEM FOR V-TYPE INTERNAL COMBUSTION ENGINES

Adam R. Thompson, Plymouth, Ind.

Application August 17, 1954, Serial No. 450,431

2 Claims. (Cl. 123—119)

This invention relates to fuel distributor means for V-type internal combustion engines. More particularly, the invention has reference to fuel distributor means as described, embodying the use of an intake manifold consisting of a plurality of flexible tubes equal in length and cross sectional size, each connected between an intake port of a cylinder, and an outlet port on the perimeter of a supercharger housing. The distributing system further comprises, in combination with tubes as stated, supercharger means mounted between the two banks of cylinders of the engine, particularly adapted to force fuel into the peripheral area of the supercharger and through the outlet ports for passage through the flexible tubes to the several cylinders of the engine.

One important object of the present invention is to provide an improved fuel distributor means of the character referred to, that is especially adapted to increase the efficiency whereby the fuel is forced from the supercharger through the flexible tubes to the several cylinders.

Another object of importance is to provide means as stated which, though relatively simple in design as compared to fuel distribution systems on similar engines now in use, will nevertheless operate with full accuracy at all time, to produce efficient operation of the engine.

Another object is to provide fuel distribution means including a supercharger and flexible intake manifold tubes extending therefrom, that is adapted to be associated with equal facility to either two cycle or four cycle engines of the multicylinder type.

Other objects will appear from the following description, the claims appended thereto, and from the annexed drawings, in which like reference characters designate like parts throughout the several views, and wherein:

Figure 3 is a top plan view on a reduced scale, a portion of the supercharger housing being broken away; and Figure 4 is a front elevational view of an engine showing a modified drive for the supercharger, a portion of the crank case and a portion of the supercharger being broken away.

Figure 1:
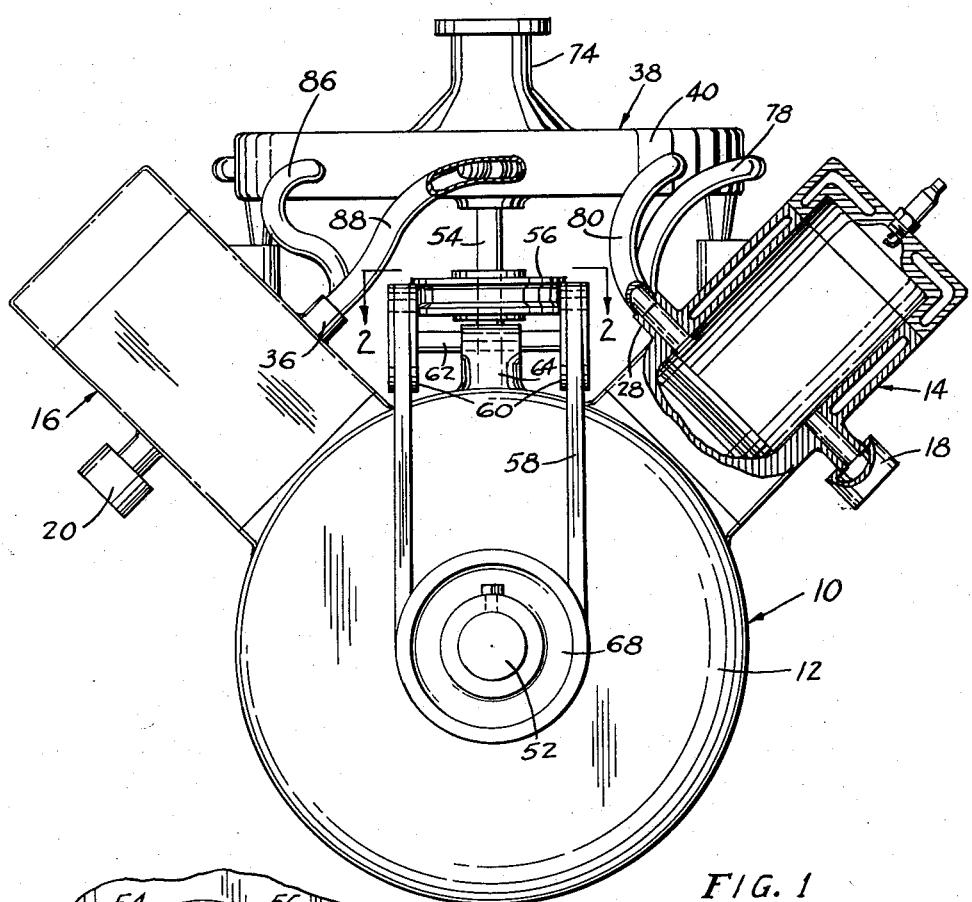
Figure 1 is a front elevational view of an internal combustion engine having incorporated therein a fuel distribution means formed in accordance with the present invention, a portion of one bank of cylinders of the engine being shown in section.
Figure 2:
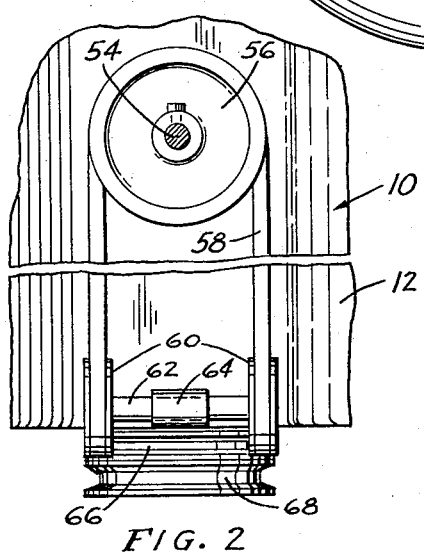
Figure 2 is a sectional view on line 2—2 of Figure 1.

In both forms of the invention, the engine has been designated generally at 10, and includes a crank case 12, on the upper portion of which are symmetrically disposed banks 14, 16 of cylinders in a V-type arrangement, each bank including four cylinders. Exhaust ports 18, 20 are provided in the cylinders of the banks 14, 16 respectively. As shown in Figure 3, bank 14 has intake ports 22, 24, 26, 28 while bank 16 has intake ports 30, 32, 34, and 36, said intake ports of the banks extending to the individual cylinders thereof.

A supercharger has been designated generally at 38 and is of similar construction in both forms of the invention. The supercharger includes a circular, flat housing 40 mounted in the space between the banks 14, 16, the housing 40 being relatively flat and having rotatably mounted therein a rotor 42. Rotor 42 is provided with equidistantly spaced fins 44 radiating from the rotor axis to the periphery of the supercharger housing. The fins are curved in the direction of their lengths, and are swept back 45° with two-thirds of the sweep-back of each fin occurring in the last one-third of its length. It will be understood that the rotor would turn clockwise in Figure 3.

In the form of the invention shown in Figure 4, the rotor is secured at its center to a rotor drive shaft 46, said shaft 46 extending downwardly from the supercharger housing into the crank case, and being there provided with a bevel gear 48 in mesh with a larger bevel gear 50 keyed to the drive shaft 52 of the engine.

In the form shown in Figure 1, the drive is modified, so as to be disposed exteriorly of the crank case, thereby to simplify mounting of the supercharger upon conventional engines already in use. In this arrangement, the supercharger drive shaft 54 does not extend into the crank case to the extent that the shaft 46 extends thereinto, being merely journalled at its lower end in a suitable bearing provided in the crank case wall.

Intermediate its ends, shaft 54 is secured to a driven pulley 56 located exteriorly of the crank case, and trained about the pulley 56 is a drive belt 58. Drive belt 58 has both flights thereof trained over sheaves 60 fixed to opposite ends of a stub shaft 62 disposed transversely of the crank case in a horizontal position and journalled medially between its ends in a bearing 64 mounted upon the upper portion of the crank case.

After being trained over the sheaves 60, the belt 58 is extended downwardly in front of the crank case, and is trained about a supercharger drive pulley 66 keyed or otherwise attached to the drive shaft 52 of the engine for rotation thereby. In front of the pulley 66 is disposed the conventional fan pulley 68 of the engine.

In both forms of the invention, the supercharger housing is the same, and includes, on its periphery, a circumferential series of outlet openings 70. Openings 70 are elongated in a direction circumferentially of the supercharger housing. In the illustrated example, wherein fuel is to be forced to 8 cylinders, the openings are spaced 45° apart, but it will be understood that this spacing will be changed according to the number of cylinders in the particular engine.

The elongation of the openings has been found to be particularly advantageous in that it doubles the size of a conventional opening, thus to increase the capacity of the opening for forcing fuel therefrom.

Mounted over the several openings 70 are correspondingly elongated or oblong tube fittings 72, to which are attached the inlet ends of flexible intake manifold tubes 74, 76, 78, 80, of bank 14, and 82, 84, 86, 88 of bank 16.

At their outlet ends, the tubes are connected to the intake ports 22, 24, 26, 28 of bank 14, and 30, 32, 34, and 36 of bank 16, respectively.

The particular formation and relative arrangement of the fins 44 and openings 70 is such as to cause one fin to be leaving the opening, and to be disposed accordingly at one side of the opening, while the next following fin is at the opposite side of the same opening 70.

Due to the arrangement illustrated and described, on rotation of the rotor of the supercharger, fuel fed into the supercharger through its inlet 74 will be forced through the several outlet openings of the supercharger to the several cylinders, said fuel passing through the flexible tubes. A relatively simple, efficiently acting fuel system for an internal combustion engine of the V-type thus results.

An important characteristic of the invention, it is worthy to note, resides in its adaptability for the conversion of generally conventional engines of the stated type to two cycle engines. However, the invention is by no means limited to such an arrangement, and is adaptable with equal facility and at equally low cost to four cycle engines. Therefore, the engine showing in the several figures of the drawing is not intended to necessarily represent a two cycle engine, and is to be taken as including four cycle engines also.

Still another feature of importance in the construction is believed to reside in the fact that the arrangement shown permits the mounting of a supercharger, with individual flexible intake manifold tubes extending to the several cylinders of the V-type engine, on conventional engines already in use, with a minimum of modification of said engines being involved.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. The combination, with an engine including a crank case, a drive shaft journaled in and projecting at one end out of the crank case, a fan pulley mounted on the projecting end of the drive shaft and a bank of cylinders having fuel intake ports, of a supercharger comprising: a belt trained about the fan pulley and extending wholly exteriorly of the crank case; a stub shaft rotatably supported on the crank case and also disposed wholly exteriorly of the crank case; direction-changing pulleys mounted on the stub shaft, said belt being trained about the latter pulleys; a supercharger drive shaft journaled at one end on the crank case and extending outwardly from the crank case exteriorly thereof; a pulley rotating with the supercharger drive shaft, said belt after being trained around the direction changing pulleys also being trained around said supercharger drive shaft pulley; a housing supported on the engine adjacent the crank shaft, said housing having a central inlet opening and a wall extending peripherally thereof formed with a circumferential series of outlet ports; a rotor within the housing adapted for forcing fuel through the several outlet ports, said rotor including a series of fins, the supercharger drive shaft extending into the housing and being connected to the rotor for rotation therewith, said fins radiating outwardly from the supercharger drive shaft into wiping contact with said wall; and means providing tubular connections between the several outlet ports and said cylinders.

2. The combination, with an engine including a crank case, a drive shaft journaled in and projecting at one end out of the crank case, a fan pulley mounted on the projecting end of the drive shaft and a bank of cylinders having fuel intake ports, of a supercharger comprising: a belt trained about the fan pulley and extending wholly exteriorly of the crank case; a stub shaft rotatably supported on the crank case and also disposed wholly exteriorly of the crank case; direction-changing pulleys mounted on the stub shaft, said belt being trained about the latter pulleys; a supercharger drive shaft journaled at one end on the crank case and extending outwardly from the crank case exteriorly thereof; a pulley rotating with the supercharger drive shaft, said belt after being trained around said direction changing pulleys also being trained around said supercharger drive shaft pulley; a housing supported on the engine adjacent the crank shaft, said housing having a central inlet opening and a wall extending peripherally thereof formed with a circumferential series of outlet ports; a rotor within the housing adapted for forcing fuel through the several outlet ports, said rotor including a series of fins, the supercharger drive shaft extending into the housing and being connected to the rotor for rotation therewith, said fins radiating outwardly from the supercharger drive shaft into wiping contact with said wall; and means providing tubular connections between the several outlet ports and said cylinders, the drive shaft of the engine rotating about a first axis, said stub shaft extending normally to the axis of the engine shaft with the pulleys carried by the stub shaft turning in planes normal to the plane of rotation of the fan pulley, the pulley carried by the supercharger drive shaft rotating in a plane normal to the planes of rotation of the fan pulley and of the pulleys carried by the stub shaft, said supercharger drive shaft extending perpendicularly to the axis of rotation of the engine drive shaft with the rotor turning in a plane parallel to the plane of the pulley carried by the supercharger drive shaft.

References Cited in the file of this patent

UNITED STATES PATENTS

| | | |
|---|---|---|
| 963,277 | Clifford | July 5, 1910 |
| 1,745,020 | Lawrence | Jan. 28, 1930 |
| 1,785,319 | Lansing | Dec. 16, 1930 |
| 1,971,550 | Wright | Aug. 28, 1934 |
| 2,426,873 | Hasbrouck et al. | Sept. 2, 1947 |
| 2,644,402 | Lehman | July 7, 1953 |
| 2,684,635 | Winkelman et al. | July 27, 1954 |

FOREIGN PATENTS

| | | |
|---|---|---|
| 488,639 | Germany | Sept. 1, 1930 |
| 443,504 | Great Britain | Mar. 2, 1936 |
| 197,669 | Switzerland | Aug. 1, 1938 |
| 268,639 | Switzerland | Sept. 1, 1950 |
| 967,350 | France | Mar. 22, 1950 |